(12) United States Patent
Clark

(10) Patent No.: US 6,572,244 B1
(45) Date of Patent: Jun. 3, 2003

(54) NOVELTY ITEM HAVING ILLUMINATING HANDLE

(76) Inventor: Jim Clark, 6519 E. 89th St., Tulsa, OK (US) 74133

(*) Notice: Subject to any disclaimer, the term of this patent is extended or adjusted under 35 U.S.C. 154(b) by 0 days.

(21) Appl. No.: 10/034,577

(22) Filed: Dec. 27, 2001

Related U.S. Application Data

(63) Continuation of application No. 09/480,028, filed on Jan. 10, 2000, now abandoned.

(51) Int. Cl.[7] .............................................. F21V 33/00
(52) U.S. Cl. ...................... 362/253; 362/84; 362/109; 362/806; 362/34
(58) Field of Search .................... 362/34, 84, 253, 362/806, 109

(56) References Cited

U.S. PATENT DOCUMENTS

| | | | |
|---|---|---|---|
| 4,313,843 A | 2/1982 | Bollyky et al. | 252/188.3 |
| 4,717,511 A | 1/1988 | Koroscil | 252/700 |
| 4,924,358 A | 5/1990 | Von Heck | 362/34 |
| 5,122,306 A | 6/1992 | Van Moer et al. | 252/700 |
| 5,158,349 A | 10/1992 | Holland et al. | 362/34 |
| 5,190,366 A | 3/1993 | World | 362/253 |
| 5,403,051 A | 4/1995 | Watkins | 284/5.5 |
| 5,471,373 A | 11/1995 | Coleman et al. | 362/253 |
| 5,545,069 A | 8/1996 | Glynn et al. | 362/253 |
| 5,666,693 A | 9/1997 | Levay | 16/114 R |
| 5,676,988 A | 10/1997 | Coleman et al. | 362/109 |
| 5,733,033 A | 3/1998 | Coleman et al. | 362/109 |
| 5,830,034 A | 11/1998 | Cichanowski et al. | 446/219 |
| 5,876,995 A | 3/1999 | Bryan | 435/189 |
| 5,938,153 A | 8/1999 | Coleman et al. | 362/109 |
| 5,939,983 A | 8/1999 | Rudell et al. | 340/540 |
| 5,946,773 A | 9/1999 | Esker et al. | 16/110 R |
| 5,961,199 A | 10/1999 | Lee | 362/34 |
| 6,050,697 A | 4/2000 | Bennington | 362/253 |
| 6,135,606 A | 10/2000 | Fernandez et al. | 362/109 |

OTHER PUBLICATIONS

Photocopy of Product Container for "Glow Pop" product, 4 pages.

*Primary Examiner*—Laura K. Tso
(74) *Attorney, Agent, or Firm*—Head, Johnson and Kachigian

(57) ABSTRACT

The present invention is directed to an illuminated novelty item. In one embodiment, the novelty item includes an edible, food item supported on a hollow, translucent handle. A light source is also provided to illuminate the interior, hollow portion of the handle. Since the handle is translucent, the light radiated through the handle and into the edible food item. If the food item is translucent, which it preferable is, then the light also radiates through the food item in a unique and visually-desirable fashion. In one embodiment the food item is an ice confection, such as a Popsicle® Ice Confection. In another embodiment, the food item may be cotton candy. In yet another embodiment, the food item may be a sucker or lollipop, which is supported on a translucent handle in the same way as the ice confection mentioned above. Consistent with the invention, the light source may take on a variety of forms. In one embodiment, the light source may be a simple incandescent light that may be, for example, battery operated. Preferably, however, the light source is a passive (i.e., not requiring a battery or other power source) component, such as a bioluminescent or phosphorescent material. In the preferred embodiment, the light source may be a material such as a Glow Stick, Glow Worm, or other such device that is commonly sold at amusement parks.

11 Claims, 4 Drawing Sheets

NOVELTY ITEM HAVING ILLUMINATING HANDLE

CROSS-REFERENCE TO RELATED APPLICATIONS

This is a continuation application of Ser. No. 09/480,028 filed on Jan. 10, 2000 abandoned.

BACKGROUND OF THE INVENTION

1. Field of the Invention

The present invention generally relates to novelty items, and more particularly, to illuminated novelty items.

2. Discussion of the Related Art

It is well known that the appearance of an object often increases the desire and demand for the item. Indeed, the commercial success of many marketable products often depends largely on the attractiveness of the product, or the interest it holds for the consumer. Thus, novelty items often provide a unique, attractive, or amusing appearance. As is known, novelty items of all sorts are sold and used at fairs, carnivals, amusement parks, and other similar environments. The term "novelty item" broadly encompasses toys, food items, and other devices that provide some sort of amusement or entertainment for the consumer.

As used herein, novelty items refer to inanimate articles of manufacture that are intended to provide, even for only a few moments, amusement, entertainment, decoration or recreation. The use for recreation or entertainment may be the only use for the items or may be in addition to other uses or benefits of the items.

With regard to consumable, food items, it is known that users often desire much more than just the food item, but also desire an amusement or entertainment component.

For example, lollipops or suckers have been formed in the shape of whistles to allow a person to make a whistle sound with the item, as well as eat it. Lollipops, suckers, POPSICLE® Ice Confection, and other food items have also been shaped into interesting or amusing shapes.

Many such items have been the subject of U.S. patents. For example, U.S. Pat. No. 5,946,773 is directed to a food product having a uniquely shaped and multi-colored handle. U.S. Pat. No. 5,939,983 discloses a novelty device that makes a sound and/or illuminates a light as a user is consuming (or otherwise comes in contact with) a consumable substance supported on a handle of the device. U.S. Pat. No. 5,666,693 discloses a unique toy handle for an oral device, such as a lollipop or popsicle. Specifically, FIGS. 1A–1C of that patent illustrate a handle in the shape of the back end of an animal, like a lizard or a frog. This uniquely-shaped handle gives the appearance of the consumer eating a frog or lizard, when the consumable end of the product is held in the mouth of the consumer.

As is also known, many other types of novelty devices are sold and used at fairs, carnivals, and amusement parks. For example, many lighted novelty devices are frequently sold or used in the evening hours after dark. Some such devices include those sold under the name of "glow sticks" or "glow worms." As is known, these and other similar devices emit a soft, colorful glow in the dark, and are often purchased solely for the appearance that they give in the dark.

Accordingly, it is desired to provide an illuminated novelty item preferably for sale or use at carnivals, fairs, amusement parks, and other similar environments.

SUMMARY OF THE INVENTION

Accordingly, it is an object of the present invention to provide an improved novelty food item.

Another object of the present invention is to provide a novelty item having a unique handle for illuminating the object.

Still another object of the present invention is to provide a novelty food item capable of being internally illuminated.

Other objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to an illuminated novelty item. In one embodiment, the novelty item includes an edible, food item supported on a hollow, translucent handle. A light source is also provided to illuminate the interior, hollow portion of the handle. Since the handle is translucent, the light radiates through the handle and into the edible food item. If the food item is translucent, which it preferably is, then the light also radiates through the food item in a unique and visually-desirable fashion.

In one embodiment the food item is an ice confection, such as a POPSICLE® Ice Confection. As is known, such ice confections are typically flavored and colored consistent with the flavoring. In this respect, a grape-flavored POPSICLE® Ice Confection is purple in color, a cherry-flavored POPSICLE® Ice Confection is red in color, an orange-flavored POPSICLE® Ice Confection is orange in color, and so on. Thus, when the light radiates through the translucent handle and into the confection, it also radiates through the confection to cause the confection to create a colorful glow. In another embodiment, the food item may be cotton candy. As is known, cotton candy is very porous. As a result, light radiating from within the cotton candy causes the cotton candy to emanate a unique and colorful glow. In yet another embodiment, the food item may be a sucker or lollipop, which is supported on a translucent handle in the same way as the ice confection mentioned above.

Consistent with the invention, the light source may take on a variety of forms. In one embodiment, the light source may be a simple incandescent light that may be, for example, battery operated. Preferably, however, the light source is a passive (i.e., not requiring a battery or other power source) component, such as a bioluminescent or phosphorescent material. In the preferred embodiment, the light source may be a material such as a Glow Stick, Glow Worm, or other such device that is commonly sold at amusement parks. The handle of the novelty item may be a hollow, cylindrically-shaped handle appropriately sized such that a Glow Stick, Glow Worm, or other similar device may be inserted into the hollow space of the handle. In this way, the light that radiates from the light source radiates through the translucent handle and through the edible food item.

Consistent with the broader aspects of the invention, a similar novelty item may be provided with a non-edible material surrounding the handle.

Consistent with yet another of the broad aspects of the invention, a novelty food item may be provided with a translucent handle having an interior light-receiving chamber portion. That is, in one embodiment, the invention does not require a light source, but rather requires only a translucent edible food item supported by a translucent handle, so that when a light source is introduced into the handle, the novelty item emits a colorful glow.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
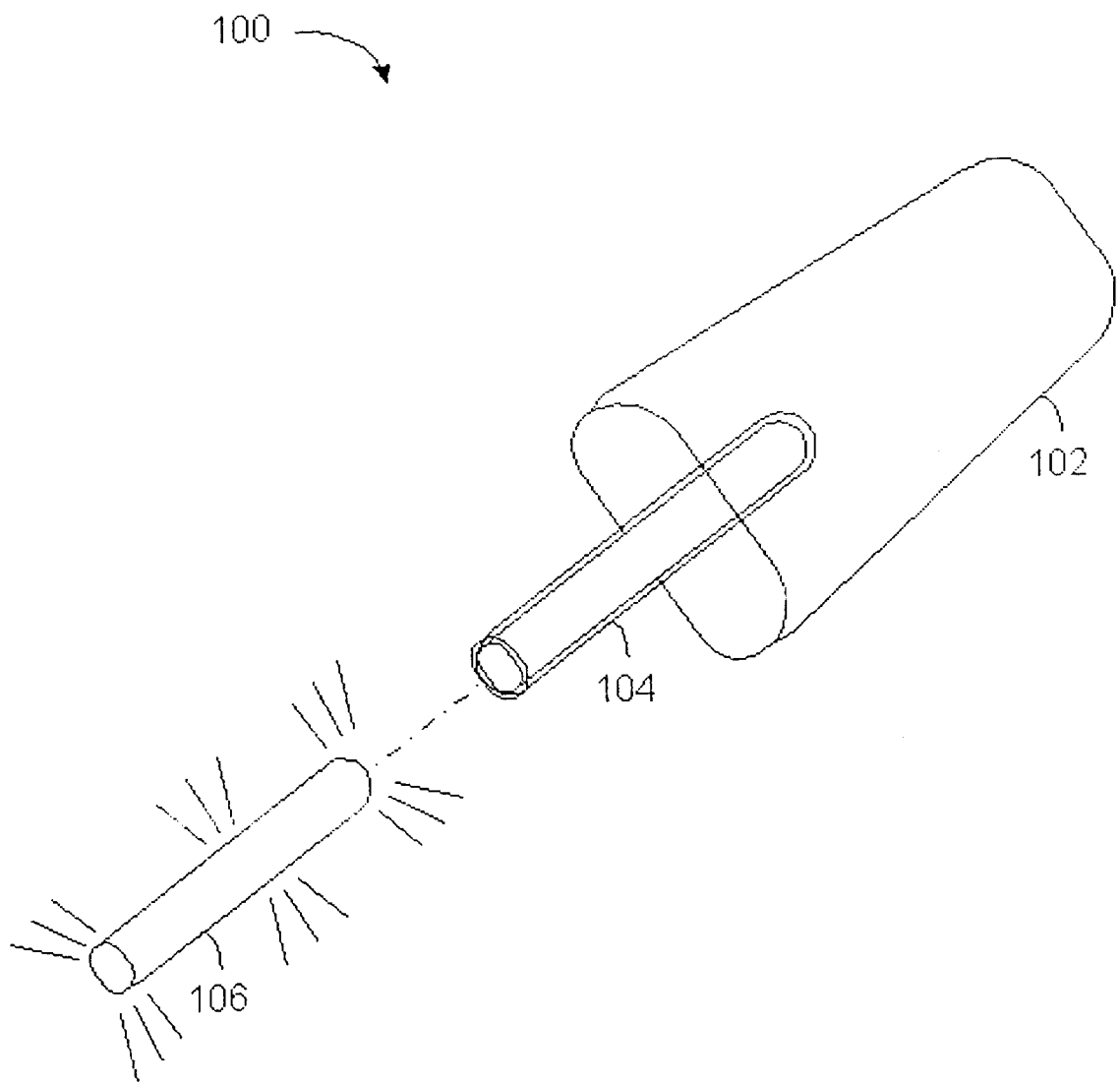
FIG. 1 is an exploded perspective view of a novelty item constructed in accordance with one aspect of the present invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, reference is made to FIG. 1, which is an exploded perspective view illustrating an ice confection 100, such as a POPSICLE® Ice Confection, constructed in accordance with one aspect of the invention. As summarized above, the present invention is directed to an illuminated novelty item. In one embodiment, the novelty item includes an edible, food item 102 supported on a hollow, translucent handle 104. A light source 106 is also provided to illuminate the interior, hollow portion of the handle. Since the handle 104 is translucent, the light generated from the light source 106 radiates through the handle and into the edible food item 102. If the food item 102 is translucent, which it preferable is, then the light also radiates through the food item 102 in a unique and visually-desirable fashion.

In the embodiment illustrated in FIG. 1. the food item 102 is an ice confection, such as a POPSICLE® Ice Confection. As is known, such ice confections are typically flavored and colored consistent with the flavoring. In this respect, a grape-flavored POPSICLE® Ice Confection is purple in color, a cherry-flavored POPSICLE® Ice Confection is red in color, an orange-flavored POPSICLE® Ice Confection is orange in color, and so on. Thus, when the light radiates through the translucent handle 104 and into the confection 102, it also radiates through the confection 102 to cause the confection 102 to create a colorful glow.

As is known, an ordinary POPSICLE® Ice Confection stick is typically an elongated flat piece of wood which has rounded ends. In most instances, the wood has a somewhat roughhewn texture. This roughness, or semi-roughness, is useful insofar as it is intended to give the POPSICLE® Ice Confection stick a texture that helps adhere frozen food products to the stick. In use, it is typical for only a portion of the stick to be embedded into the food product. The remaining portion of the stick then extends outwardly from the food product to provide a handle for the consumer.

For many years, confection producers had difficulty in manufacturing ice confections using plastic sticks. However, these historic difficulties have been overcome. For example, U.S. Pat. No. 5,403,051, which is hereby incorporated by reference, teaches the manufacture of ice confections having a plastic handle. Techniques such as that taught in the '051 patent, or others which are known in the art, may be utilized to form the novelty item 100 with a plastic handle 104. Consistent with the scope and spirit of the invention, however, other materials may also be used for the handle 104. For purposes of the invention, it is desirable only that the handle 104, or at least a portion thereof, is translucent, so that light may radiate through it.

Consistent with the invention, the light source 106 may take on a variety of forms. In one embodiment, the light source 106 may be a simple incandescent light that may be, for example, battery operated. Preferably, however, the light source is a passive (i.e., not requiring a battery or other power source) component, such as a bioluminescent or phosphorescent material. In the preferred embodiment, the light source 106 may be a device such as a Glow Stick, Glow Worm, or other such device that is commonly sold at amusement parks. The handle of the novelty item 100 may include a hollow, cylindrically-shaped handle 104 appropriately sized such that a Glow Stick, Glow Worm, or other similar device may be inserted into the hollow space of the handle 104. In this way, the light that radiates from the light source 106 radiates through the translucent handle 104 and through the edible food item 102.

Thus, one embodiment, the light source 106 may be a phosphorescent light source. Phosphorescent amusement devices, including so-called "glow-in-the-dark" toys, have been popular for a long time. As is well known, many different interesting glow-in-the-dark effects can be achieved by incorporating phosphorescent chemicals into a myriad of different toy configurations. For example, U.S. Pat. No. 2,644,890, which is hereby incorporated by reference, discloses amusement devices, each of which consists of a sealed envelope containing phosphorescent particles visible from outside the envelope. Other materials and types of phosphorescent devices may be utilized to provide the light source 106 of the present invention. U.S. Pat. No. 5,830,034, which is hereby incorporated by reference, also discloses a phosphorescent amusement device. Since phosphorescent devices are well known, the details of implementing such a device or quality as the light source of one embodiment of the present invention need not be described herein.

As an alternative to the above-disclosed light sources, the light source 106 may also be in the form of a bioluminescent material. As is known, luminescence is a phenomenon in which energy is specifically channeled to a molecule to produce an excited state. Return to a lower energy state is accompanied by release of a photon. Luminescence includes fluorescence, phosphorescence, chemiluminescence and bioluminescence. Bioluminescence is the process by which living organisms emit light that is visible to other organisms. When the luminescence is bioluminescence, creation of the excited state derives from an enzyme catalyzed reaction. The color of the emitted light in a bioluminescent (or chemiluminescent or other luminescent) reaction is characteristic of the excited molecule, and is independent from its source of excitation and temperature.

An important condition for bioluminescence is the use of molecular oxygen, either bound or free in the presence of a luciferase. Luciferases, are oxygenases, that act on a substrate, luciferin, in the presence of molecular oxygen and transform the substrate to an excited state. Upon return to a lower energy level, energy is released in the form of light.

Bioluminescence, as well as other types of chemiluminescence, may be used for quantitative determinations of specific substances in biology and medicine. For example, luciferase genes have been cloned and exploited as reporter genes in numerous assays, for many purposes. Since the different luciferase systems have different specific requirements, they may be used to detect and quantify a variety of substances. The majority of commercial bioluminescence applications are based on firefly.

Bioluminescence may also be used as the light source 106 of the invention, because it can be sustained to provide a glow that lasts, if desired, from minutes up to hours. As yet an alternative light source, a laser could be used be used to provide the light source 106 of the invention.

Figure 2:
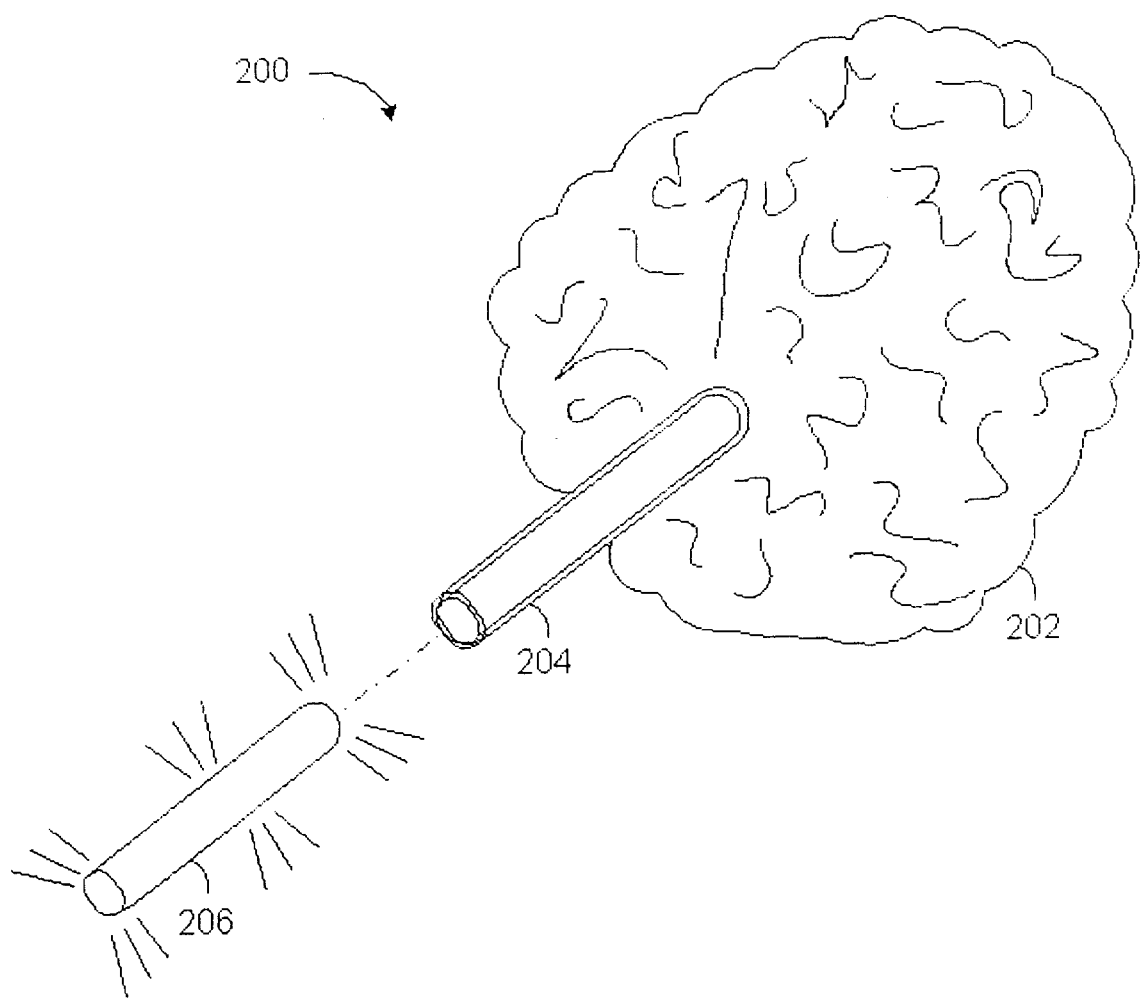
FIG. 2 is an exploded perspective view of a novelty item constructed in accordance with another aspect of the present invention.
Figure 3:
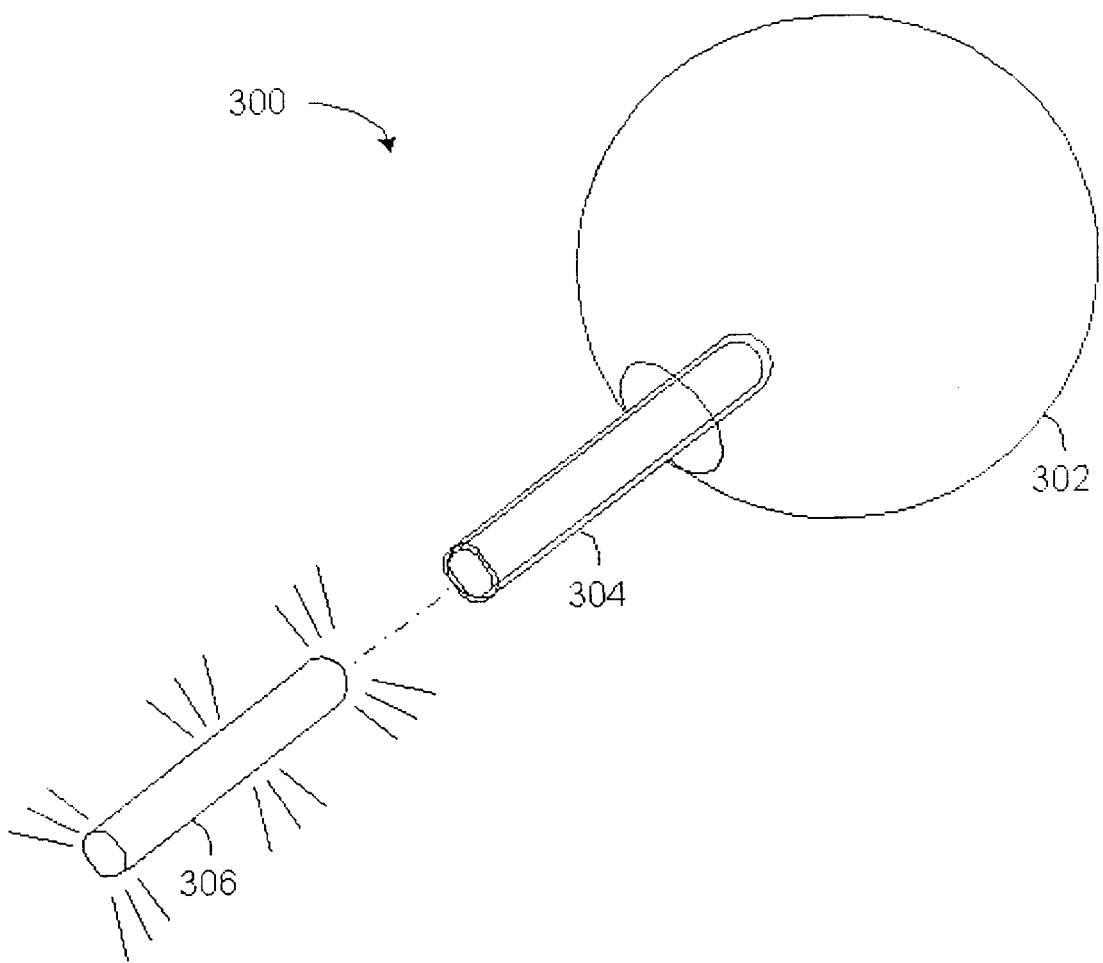
FIG. 3 is an exploded perspective view of a novelty item constructed in accordance with another aspect of the invention.

While the above discussion has focused on a popsicle stick, it is to be understood that other types of food products may also use stick handles and, thus, have similar characteristics. In the embodiment shown in FIG. 2, the food item is cotton candy 202. As is known, cotton candy 202 is very porous. As a result, light 206 radiating from within the cotton candy 202 causes the cotton candy to emanate a unique and colorful glow. In yet another embodiment, shown in FIG. 3, the food item 302 may be a sucker or lollipop 300, which is supported on a translucent handle 304 in the same way as the ice confection mentioned above in connection with FIG. 1. A light source, such as a glow stick 306 may be inserted into the hollow portion (or chamber) of the handle 304 in order to cause the sucker or lollipop to illuminate or emit a colorful glow. Consistent with the scope and spirit of the invention, other (non-food) novelty items may be supported by the translucent handle.

Figure 4:
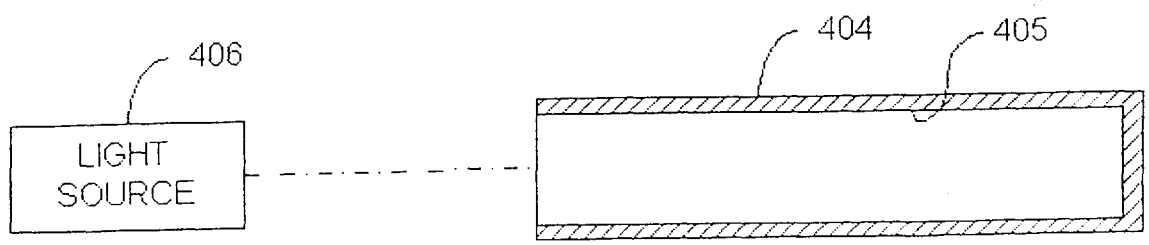
FIG. 4 is a cross-sectional view of a handle for a novelty item, in accordance with one embodiment.

As illustrated in FIG. 4, the handle 404 of the invention is preferably cylindrically-shaped and made of plastic. However, other shapes and materials can be used consistent with the broader aspects of the invention. In this respect, it is important only that the handle is made from a translucent material that allows the light from the light source 406 to radiate through the walls of the handle 404 and into the novelty item (not shown in FIG. 4). The translucent material of the handle 404 may be clear or colored. Alternatively, the light source 404 may emit clear (white light) or colored light. Further still, the interior chamber 405 of the handle 404 may be cylindrically-shaped, and closely contoured with the outer shape of the handle 404.

Figure 5:
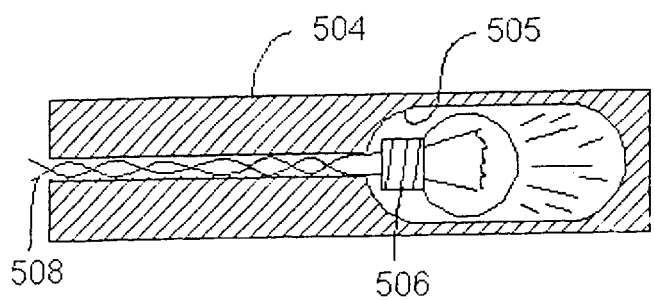
FIG. 5 is a cross-sectional view of a handle for a novelty item, in accordance with another embodiment.

However, consistent with the scope and spirit of the invention, the interior chamber of the handle may take on a variety of shapes. For example, as illustrated in FIG. 5, the chamber 505 may be located at or near one end of the handle 504. Preferably, this end of the handle will be the same end that supports the confection or other novelty item. As also shown in FIG. 5 an alternative light source 506 may be used.

Specifically, the embodiment of FIG. 5 illustrates a small incandescent bulb 506 that is disposed within the chamber 505 to emit light within the chamber 505. Electrical leads 508 may extend from the light source 506 to the end of the handle 504 where they may be connected to a battery or other appropriate power source.

The embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A novelty food item comprising:

an edible item;

a handle adapted to support the food item comprising a food item support section and a handle section, wherein said handle section is opaque and said item support section is translucent and has an interior chamber; and a light source adapted to illuminate the chamber portion of the item support section of the handle, whereby the light radiates through the translucent item support section and through the food item and does not substantially penetrate the handle section.

2. The novelty food item of claim 1 wherein the edible item is an iced confection.

3. The novelty food item of claim 2 wherein the novelty food item is a popsicle.

4. The novelty food item of claim 1 wherein the edible item is cotton candy.

5. The novelty food item of claim 1 wherein the edible item is a non-frozen, but solid confection.

6. The novelty food item of claim 1 wherein the handle is cylindrically shaped.

7. The novelty food item of claim 1 wherein the light source is a bioluminescent material.

8. The novelty food item of claim 1 wherein the light source is a phosphorescent material.

9. The novelty food item of claim 1 wherein the light source is an electric light bulb.

10. The novelty food item of claim 9 wherein the said handle section of the handle further comprises a hollow chamber and a battery within the chamber and engaged with the electric light bulb such as to provide current to the electric light bulb.

11. The novelty food item of claim 1 wherein the handle is comprised of plastic.

* * * * *